United States Patent [19]

Gardner et al.

[11] Patent Number: 4,590,963
[45] Date of Patent: May 27, 1986

[54] METHOD OF AND APPARATUS FOR DETERMINING THE POSITION OF A MOVABLE MEMBER

[75] Inventors: William N. Gardner, Enfield; Kenneth R. Rohde, Granby, both of Conn.

[73] Assignee: Combustion Engineering Co., Inc., Windsor, Conn.

[21] Appl. No.: 719,893

[22] Filed: Apr. 3, 1985

[51] Int. Cl.⁴ .............................................. F16K 37/00
[52] U.S. Cl. ................................ 137/554; 340/825.07; 364/550
[58] Field of Search ................... 137/554; 340/870.28, 340/870.16, 825.07, 348.42; 376/215, 216, 247; 73/168; 364/505, 506, 558, 550, 551

[56] References Cited

U.S. PATENT DOCUMENTS

| | | | |
|---|---|---|---|
| 2,898,543 | 8/1959 | Roper et al. | 340/870.16 |
| 3,852,730 | 12/1974 | Commins | 340/870.16 |
| 4,031,513 | 6/1977 | Simciak | 340/870.28 |
| 4,523,286 | 6/1985 | Koga et al. | 137/554 |

FOREIGN PATENT DOCUMENTS 168000 12/1981 Japan .................................. 137/554

*Primary Examiner*—Larry Jones
*Assistant Examiner*—Noah P. Kamen

[57] ABSTRACT

The position of a valve member is sensed by a transducer mounted on the exterior of the valve housing. The transducer is connected to a passive circuit located within an enclosure mounted on or adjacent to the valve housing. The passive circuit, when connected to a source of electrical power, provides a signal commensurate with the output of the transducer and an encoded signal which identifies the valve. The information contained in these signals is transmitted to a remote location, decoded and employed to determine the existance of a valve member position error.

18 Claims, 2 Drawing Figures

METHOD OF AND APPARATUS FOR DETERMINING THE POSITION OF A MOVABLE MEMBER

BACKGROUND OF THE INVENTION (1) Field of the Invention

The present invention relates to insuring the correct positioning of movable members such as valve actuators and particularly to a technique for determining, from a remote location, the position of each of a plurality of adjustable members. More specifically, this invention is directed to apparatus for providing an indication of positioning errors of movable members and especially to apparatus for determining the position of a valve member without breaching the valve housing. Accordingly, the general objects of the present invention are to provide novel and improved methods and apparatus of such character.

(2) Description of the Prior Art

While not limited thereto in its utility, the present invention is particularly well-suited for use in ascertaining the condition of remotely located fluid flow control devices. There has been a long-standing need in the art for apparatus having the capability of reliably determining and indicating, at a remote location, the position of movable valve members relative to the valve seats with which such valve members cooperate. In a power plant, especially a nuclear power plant, there are a large number of valves located at various sites throughout the facility over which the plant operator must exercise supervision and control. The proper positioning of the valve members of these valves is essential to proper plant operation. Some of these valves will usually be inconveniently located and/or located so as to be in a harsh, typically high temperature, operating environment.

In the operation of existing power plants employed in the generation of electricity many of the control valves are adjustable manually. Manual control presents two potential problems. Firstly, because of the large number of valves which must be controlled, there is an inherent possibility that the technician may become confused as to valve identity. Secondly, although the correct valve is selected for adjustment, human error leads to the possibility of incorrect adjustment.

SUMMARY OF THE INVENTION

The present invention overcomes the above-briefly discussed and other deficiencies and disadvantages of the prior art by enabling the determination, at a remote location, of the positions of a large number of movable members such as valve actuators. Apparatus in accordance with the present invention is characterized by ease of installation and particularly by the ability to retro-fit a position sensor on to existing valves, by avoidance of the need for hard wiring between each position sensor and a central control station, and by the lack of need to penetrate the wall of the valve housing in order to ascertain its state. The present invention, in operation, permits individual values to be positively identified and the actual position of the valve actuators to be compared to a desired position at a central control location. Should a position error exist, the magnitude of the error and the identity of the improperly adjusted valve will be recorded at the central location and a record prepared. The plant operator may subsequently refer to this record when taking action to correct the error. In an alternative embodiment, the position error will be transmitted to the valve site so that the technician may take immediate corrective action.

BRIEF DESCRIPTION OF THE DRAWING

The present invention may be better understood and its numerous objects and advantages will become apparent to those skilled in the art by reference to the accompanying drawing wherein like reference numerals refer to like elements in the two FIGS. and in which.

DESCRIPTION OF THE DISCLOSED EMBODIMENT

Figure 1:
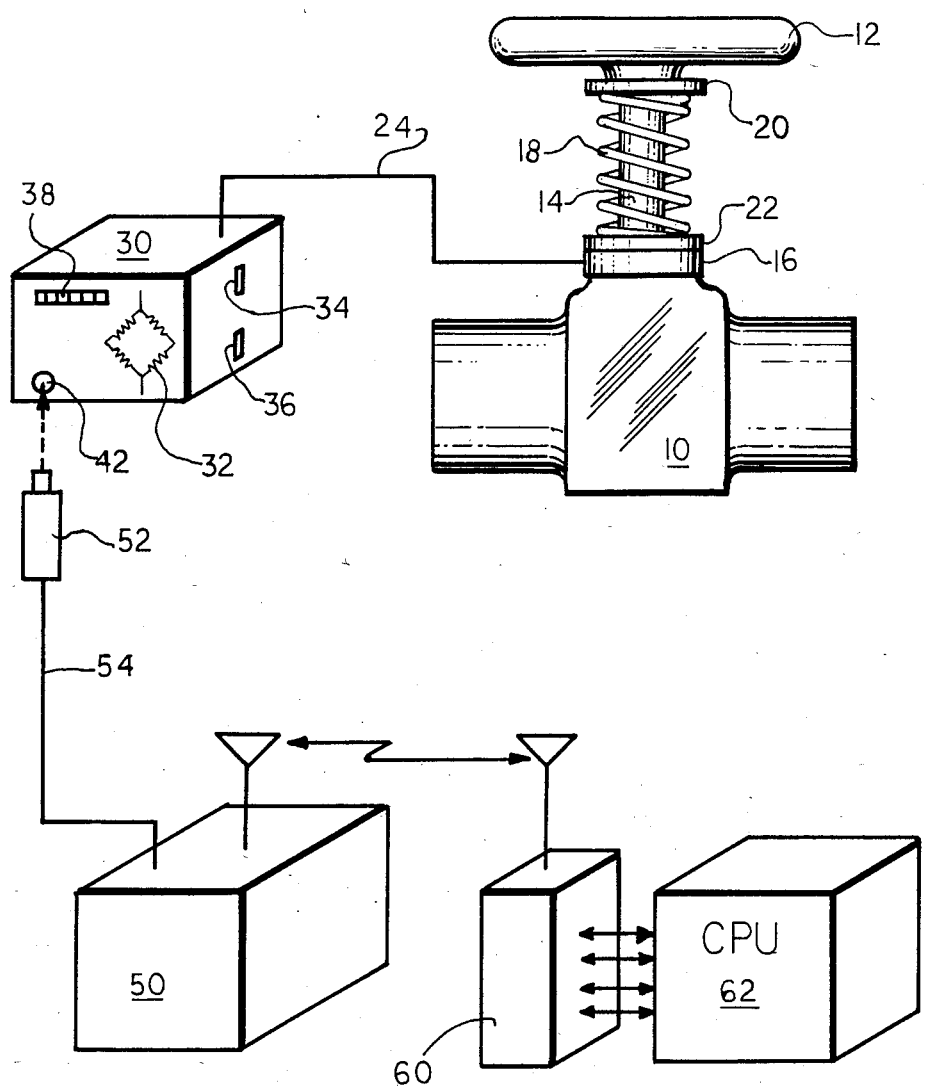
FIG. 1 is a functional block diagram of apparatus in accordance with a first embodiment of the invention.

With reference now to the drawing, the present invention is depicted as being associated with a single valve which has been indicated generally at 10. It will be understood that in a typical operating environment there may be one thousand or more valves which must be properly controlled for suitable operation of the system in which the valves are installed. The valve 10 is manually adjustable to establish a condition of flow therethrough commensurate with a selected mode of operation of the system. This manual adjustment is performed by a workman using a rotary valve actuator which includes a valve handle 12 coupled to a shaft 14 which extends into the body of valve 10. Shaft 14 will typically be threaded engaged in and sealed to the valve body and will be mechanically coupled to the valve member or flow controller. In the manner well-known in the art, the spacing of handle 12 from the valve body will be a direct function of the position of the valve member relative to the valve seat and thus will be indicative of the state, i.e., flow condition, of the valve.

In accordance with the disclosed embodiment of the present invention a position sensor will be mounted on the exterior of valve 10 for the purpose of determining, with a high degree of precision, the spacing between handle 12 and the valve body. In the disclosed embodiment this sensor comprises a load cell 16 having the form of a washer. The load cell is capable of withstanding the environmental conditions to which it will be exposed and may, by way of example only, comprise Action Instruments model S520 or a similar device. the load cell 16 is affixed to the valve body, by any suitable means, so as to be co-axial with shaft 14. The position sensor also includes a biasing device 18, indicated in FIG. 1 as a spring, which is sandwiched between a pair of plates 20 and 22. The plates 20 and 22 have the same general shape as the load cell 16 and are also mounted so as to be co-axial with shaft 14. Plate 20 will be in contact with the underside of handle 12 while plate 22 will be affixed to the upper side of load cell 16. In actual practice, the plate 22 may be part of the load cell 16. The biasing device 18 will preferably be a spring which has the ability to collapse to a flat state such as a conical flat collapsing spring.

The force applied to load cell 16 will be a function of the compression of spring 18, which is a function of the spacing of handle 12 from the valve body, and thus a function of the position of the valve member relative to the valve seat. Load cell 16 will provide an electrical output signal, on conductor 24, which is commensurate with the force applied thereto. The electrical signal appearing on conductor 24, accordingly, will be a function of the position of the valve member. If the relationship between the signal generated by load cell 16 and the flow condition of the valve is other than a linear function, appropriate compensation may be effected either at the central control location or at the valve site, for example by incorporation of a function generator in apparatus which receives the signal generated by the load cell.

The load cell output signal on conductor 24 is, as noted above, delivered as an input to a passive position signal generator 30 which is mounted in the vicinity of valve 10 and permanently associated therewith. Signal generator 30 may be mounted on or adjacent to valve 10 or, if the valve is inconveniently located, at a position which is as near as possible to the valve and reachable by a workman. Signal generator 30 includes, as may be seen from FIG. 2, a bridge circuit 32 which, in response to the load cell output signal, provides an output commensurate with a valve member position. The signal generator 30 also includes a pair of "trimming" potentiometers 34 and 36 which, with power applied to signal generator 30 and thus to load cell 16, are used to adjust the bridge circuit so that the output signal measured thereacross will vary between a high level with the valve 10 fully open and a low level with the valve 10 fully closed. The signal generator 30 also includes an array of "dip" switches 38 which may be individually set so as to provide a coded output signal which uniquely identifies valve 10. The array of switches 38 is connected to an identification circuit 40 which, when power is applied, provides an analog output signal which is unique to each valve. The signal generator 30 is provided with a connector 42 which provides, on contacts thereof, the coded valve identification signal and the signal commensurate with valve member position. The connector 42 also includes contacts whereby power may be applied to signal generator 30.

The components which comprise the passive position signal generator 30 are housed in an environmentally resistant enclosure 44 which is sealed after the dip switches have been set and the potentiometers 34 and 36 adjusted. This enclosure will be appropriately marked with the identification of the valve and, as noted above, will be mounted so as to be readily accessible to a workman but also in proximity to the valve. The connector 42 will, of course, be accessible from the exterior of enclosure 44.

It is particularly to be noted that, because of the potentially harsh operating environment, all of the components comprising position signal generator 30 will be passive and will be chosen for their ability to function for long time periods without degradation and particularly without significantly changing in value.

Power is supplied to signal generator 30 by means of a hand-held RF transceiver 50. Transceiver 50 is coupled to the position signal generator 30 by means of a multicontact plug 52 and associated cable 54. With position signal generator 30 energized from the battery pack in transceiver 50, the carrier signal produced in the transceiver will be modulated by the pre-set valve identifying information and by the position signal commensurate with the "unbalance" of the bridge circuit resulting from the output of the load cell 16. The valve identification and position information will be transmitted to a stationary transceiver 60 wherein the carrier will be demodulated and the valve position and identification data delivered to computer 62. Computer 62 will function as a look-up table which contains pre-recorded position data for each valve and each mode of operation. Computer 62 will compare the actual position of valve 10 with the desired position for the system operating mode and, should a position error exist, the valve identification will be retransmitted possibly along with position error information. The retransmitted information, with or without position error information, will be received and demodulated by protable transceiver 50.

Figure 2:
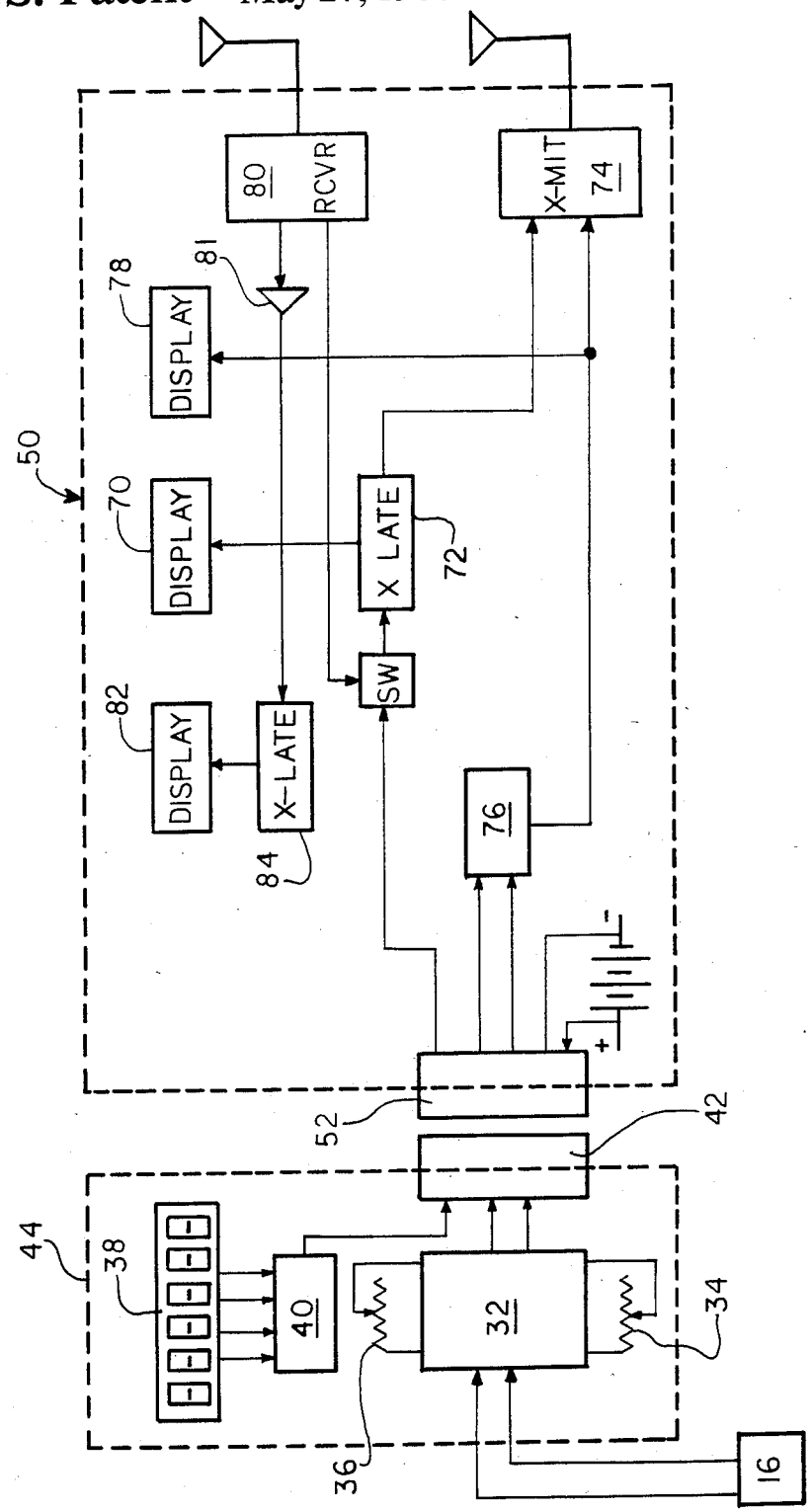
FIG. 2 is an electrical circuit block diagram of a portion of the apparatus of the embodiment of FIG. 1.

The transceiver 50 is also depicted, in functional block diagram form, in FIG. 2. In a preferred embodiment the transceiver will have a display 70 for providing the workman with a visual indication of the valve identity. The valve indentity signal read out of the passive signal generator 30 will be translated into drive signals for the display 70 by a translation circuit 72 and will also be delivered to the modulation signal input of an RF transmitter 74. The identification information transmitted from the computer site will be demodulated and similarly displayed. The display 70 may alternate between the locally derived indentification information and the computer generated information or an alarm condition may be displayed if the two pieces of identifying information do not match.

The valve position information may be limited checked, in circuit 76, and employed to modulate transmitter 74. The valve position may also be displayed locally by means of a display 78. Position error information, and the direction of adjustment required to null the error, will be transmitted from the computer via transceiver 60 and received and demodulated in receiver 80. The position error information will, after amplification in a D.C. amplifier 81, be displayed on a display 82, the drive signals for the display being generated by a translation circuit 84. If deemed necessary or desirable, an audible warning indicative of a position error greater than a preselected magnitude may be provided. The transceiver 50 will also typically be provided with mode select switches and condition indicators to indicate the state of the power supply and the operative state of the passive position signal generator 30. The transceiver 50 will additionally include appropriate registers for storing the last information received and means for clearing the stored information.

While a preferred embodiment has been shown and described, various modifications and substitutions may be made thereto without departing from the spirit and scope of the invention. Accordingly, it is to be understood that the present invention has been described by way of illustration and not limitation.

What is claimed is:

1. A method of determining whether a movable member is correctly positioned from a location remote from the member comprising the steps of:
   recording the identity of and a desired position of the movable member at the remote location;
   coupling a position sensor to the movable member;
   connecting a passive position signal generator to the position sensor;
   configuring a movable member identification signal generator associated with and located in the vicinity of the movable member so that it may produce an encoded signal which uniquely identifies the movable member;
   supplying power to the passive position signal generator and the movable member identification signal generator whereby the position signal generator will produce an information bearing signal commensurate with movable member actual position and the movable member identification signal generator will produce an information bearing signal commensurate with the identity of the movable member;

transmitting the position and identity information contained in the signals produced by the position signal generator and the movable member identification signal generator when power is supplied thereto to a remote location;

receiving the transmitted information at the remote location;

employing the transmitted identity information to determine the desired position of the movable member from the recorded information; and comparing the signals commensurate with the actual and desired positions of the movable member to ascertain if a position error exists.

2. The method of claim 1 wherein the step of configuring includes:
adjusting the movable member identification signal generator such that when energized it produces a signal which identifies the movable member.

3. The method of claim 1 wherein the position sensor is a load cell and wherein the step of coupling includes:
affixing the load cell to the movable member; and
applying a bias to the load cell such that the load cell will provide an output signal at each limit of expected travel of the movable member.

4. The method of claim 3 wherein the step of configuring includes:
adjusting the movable member identification signal generator such that when energized it produces a signal which identifies the movable member.

5. The method of claim 4 further comprising:
adjusting the position signal generator such that the position information bearing signals produced form the load cell output signals will be within predetermined limits.

6. The method of claim 1 further comprising:
generating a signal commensurate with any position error;
modulating a transmitter with the position error signal whereby the position error information is transmitted to the vicinity of the movable member;
receiving the transmitted position error information and producing a position error display therefrom; and
repositioning the movable member to rectify any position error.

7. The method of claim 4 further comprising:
generating a signal commensurate with any position error;
modulating a transmitter with the position error signal whereby the position error information is transmitted to the vicinity of the movable member;
receiving the transmitted position error information and producing a position error display therefrom; and
repositioning the movable member to rectify any position error.

8. The method of claim 7 further comprising:
adjusting the position signal generator such that the position information bearing signals produced from the load cell output signals will be within predetermined limits.

9. The method of claim 1 wherein the movable member is one of a plurality of valve members, each valve member has a unique identity and wherein the step of recording comprises compiling a listing of valve member identities and desired positions.

10. The method of claim 9 wherein the step of employing comprises:
looking up the desired valve member position from the listing using the identity information.

11. The method of claim 10 wherein the valve has a housing, the valve member has a manual actuator for varying the position of the valve member relative to the valve seat and wherein the step of mounting comprises:
affixing a load cell to the valve housing; and
resiliently coupling the manual actuator to the load cell to thereby apply a resilient bias to the load cell, the bias varying as a function of the position of the manual actuator relative to the valve housing.

12. A method of claim 11 wherein the step of configuring includes:
adjusting the movable member identification signal generator such that when energized it produces a signal which identifies the valve member.

13. The method of claim 12 further comprising:
adjusting the position signal generator such that the position information bearing signals produced from the load cell output signals will be within predetermined limits.

14. The method of claim 13 further comprising:
generating a signal commensurate with any position error;
modulating a transmitter with the position error signal whereby the position error information is transmitted to the vicinity of the valve member;
receiving the transmitted position error information and producing a position error display therefrom; and
repositioning the valve member to rectify any position error.

15. Apparatus for providing a signal commensurate with the position of a valve member relative to a valve seat, the valve member and valve seat being located within a valve housing, an actuator penetrating the valve housing and being connected to the valve member whereby the position of the valve member may be adjusted, said apparatus comprising:
transducer means, said transducer means being mounted on the exterior of the valve housing;
means coupling the actuator to said transducer means whereby said transducer means will generate a signal commensurate with valve actuator position;
first passive circuit means responsive to an input signal generated by said transducer means and to an applied electrical potential for producing an output signal having a magnitude which is a function of valve actuator position;
second passive circuit means for producing an encoded identifying signal, said second circuit means being adjustable to provide a unique identifying signal for the valve when an electrical potential is applied to said second circuit means;
housing means for said first and second circuit means, said housing means being mounted in the vicinity of the valve housing and being closed whereby unauthorized adjustment of said second circuit means is prevented, said housing means being provided with electrical connector means extending between the interior and exterior thereof for establishing electrical connections with said first and second circuit means;

means connecting said transducer means to said first passive circuit means via one of said housing means connector means whereby signals generated by said transducer means will be delivered as input signals to said first passive circuit means;

means for selectively applying an electrical potential to said first and second circuit means via said housing means connector means whereby said encoded identifying and actuator position signals will be produced; and means responsive to said identifying and position signals for producing a modulated RF signal containing the position and identification information, said RF signal producing means being connected to said first and second passive circuit means via said housing means connector means.

16. The apparatus of claim 15 wherein said transducer means is responsive to applied force and said coupling means comprises a resilient member extending between said transducer means and a stop on said actuator.

17. The apparatus of claim 16 wherein said transducer means is a load cell mounted coaxially with respect to said actuator and wherein said coupling means is a spring.

18. The apparatus of claim 17 wherein said first circuit means is a bridge circuit, said load cell being connected in one leg of said bridge circuit.

* * * * *